US007613923B2

(12) United States Patent
Gilchrist et al.

(10) Patent No.: US 7,613,923 B2
(45) Date of Patent: Nov. 3, 2009

(54) METHOD AND APPARATUS FOR CONTROLLING UNSOLICITED MESSAGING IN REAL TIME MESSAGING NETWORKS

(75) Inventors: Rod Gilchrist, Oakville (CA); Richard Fogel, Toronto (CA); John Alsop, Mississauga (CA)

(73) Assignee: WatchGuard Technologies, Inc., Seattle, WA (US)

( * ) Notice: Subject to any disclaimer, the term of this patent is extended or adjusted under 35 U.S.C. 154(b) by 793 days.

(21) Appl. No.: 11/066,660

(22) Filed: Feb. 25, 2005

(65) Prior Publication Data
US 2005/0201363 A1 Sep. 15, 2005

Related U.S. Application Data

(60) Provisional application No. 60/547,204, filed on Feb. 25, 2004.

(51) Int. Cl.
*H04L 29/00* (2006.01)
(52) U.S. Cl. ....................................................... 713/168
(58) Field of Classification Search ................. 713/168; 370/352
See application file for complete search history.

(56) References Cited

U.S. PATENT DOCUMENTS

| | | | |
|---|---|---|---|
| 5,822,416 | A | 10/1998 | Goodacre et al. |
| 6,052,709 | A | 4/2000 | Paul |
| 6,112,227 | A | 8/2000 | Heiner |
| 6,330,590 | B1 | 12/2001 | Cotten |
| 6,334,143 | B2 | 12/2001 | Kowaguchi |
| 6,393,464 | B1 | 5/2002 | Dieterman |
| 6,421,669 | B1 | 7/2002 | Gilmour et al. |
| 6,421,709 | B1 | 7/2002 | McCormick et al. |
| 6,460,050 | B1 | 10/2002 | Pace et al. |
| 6,484,197 | B1 | 11/2002 | Donohue |
| 6,507,866 | B1 | 1/2003 | Barchi |
| 6,532,489 | B1 | 3/2003 | Merchant |
| 6,539,385 | B1 | 3/2003 | Pollack et al. |
| 6,546,390 | B1 | 4/2003 | Pollack et al. |
| 6,546,416 | B1 | 4/2003 | Kirsch |

(Continued)

OTHER PUBLICATIONS

Kirstein et al, SIP Security Using Public Key Algorithms, 1998.*

(Continued)

*Primary Examiner*—Andrew L Nalven
(74) *Attorney, Agent, or Firm*—Kory D. Christensen; Stoel Rives LLP

(57) ABSTRACT

A Voice over IP (VoIP) or Real Time Messaging (RTM) firewall device is claimed that protects VoIP or RTM network traffic by identifying and controlling the delivery of such network traffic that is unsolicited and undesired by the recipient (i.e. VoIP or RTM spam). The system involves applying a unique marking to RTM messages close to a point of message origination and then at a point close to message termination for the intended recipient examining a reputation store for information on the unique marking and using that information in conjunction with a set of policy rules to decide whether to pass, reject, pass on to an RTM store or otherwise filter the RTM message. The unique marking serves to identify a source characteristic of the message such as the message originator, a corporate affiliation for the originator, or a RTM network characteristic of the originator such as a transmission gateway.

31 Claims, 1 Drawing Sheet

U.S. PATENT DOCUMENTS

| | | | |
|---|---|---|---|
| 6,571,238 | B1 | 5/2003 | Pollack et al. |
| 6,571,275 | B1 | 5/2003 | Dong et al. |
| 6,578,025 | B1 | 6/2003 | Pollack et al. |
| 6,615,242 | B1 | 9/2003 | Riemers |
| 6,622,909 | B1 | 9/2003 | Thomas et al. |
| 6,654,787 | B1 | 11/2003 | Aronson et al. |
| 6,721,785 | B1 | 4/2004 | Raghunandan |
| 6,732,149 | B1 | 5/2004 | Kephart |
| 6,769,016 | B2 | 7/2004 | Rothwell et al. |
| 6,772,196 | B1 | 8/2004 | Kirsch et al. |
| 6,778,941 | B1 | 8/2004 | Worrell et al. |
| 6,826,618 | B2 | 11/2004 | Morris et al. |
| 6,829,635 | B1 | 12/2004 | Townshend |
| 7,231,219 | B2 | 6/2007 | Curtis et al. |
| 2004/0008666 | A1* | 1/2004 | Hardjono .................. 370/352 |
| 2004/0105529 | A1 | 6/2004 | Salvucci et al. |
| 2004/0249951 | A1* | 12/2004 | Grabelsky et al. ........... 709/227 |
| 2007/0230668 | A1 | 10/2007 | Brown et al. |

OTHER PUBLICATIONS

Postel, J., "Simple Mail Transfer Protocol," RFC 821 (Aug. 1982) pp. 1-68.

Crocker, D., "Standard for the Format of ARPA Internet Text Messages," RFC 822 (Aug. 13, 1982) pp. 1-47.

Schulzrinne, et al., "RTP: A Transport Protocol for Real-Time Applications," RFC 1889 (Jan. 1996) pp. 1-75.

Freed, N., et al., "Multipurpose Internet Mail Extensions (MIME) Part One: Format of Internet Message Bodies," RFC 2045 (Nov. 1996) pp. 1-31.

Fielding, R., et al., "Hypertext Transfer Protocol—HTTP/1.1," RFC 2068 (Jan. 1997) pp. 1-133.

Dierks, T., et al., "The TLS Protocol, Version 1.0," RFC 2246 (Jan. 1999) pp. 1-78.

Kent, S., et al., "Security Architecture for the Internet Protocol," RFC 2401 (Nov. 1998) pp. 1-53.

Handley, M., et al., "SIP: Session Initiation Protocol," RFC 2543 (Mar. 1999) pp. 1-103.

Rosenberg, J., et al., "SIP: Session Initiation Protocol," RFC 3261 (Jun. 2002) pp. 1-108.

Schneier, B., "Applied Cryptography," 1996, pp. 21-46, Second Edition, John Wiley & Sons, Inc., New York.

Feghhi, J., et al., "Digital Certificates, Applied Internet Security," 1999, pp. 27-89, Addison-Wesley, Reading Massachuchets.

ITU-T Recommendation H.323, Series H: Audiovisual and Multimedia Systems, Infrastructure of Audiovisual Services-Systems and Terminal Equipment for Audiovisual Services, "Packet Based Multimedia Communications Systems," (Jul. 2003).

* cited by examiner

METHOD AND APPARATUS FOR CONTROLLING UNSOLICITED MESSAGING IN REAL TIME MESSAGING NETWORKS

This application claims the benefit of U.S. Provisional Application No. 60/547,204, filed on Feb. 25, 2004, entitled Method and Apparatus for Using Sender Identity to Control Unsolicited Messaging in Real Time Messaging Networks, which application is incorporated herein by reference.

CROSS-REFERENCE TO RELATED APPLICATIONS

This application relates to the following co-pending and commonly assigned patent application: Ser. No. 11/019,092, filed Dec. 21, 2004, entitled Method and Apparatus for Controlling Unsolicited Messaging, which application is incorporated herein by reference.

TECHNICAL FIELD

The present invention relates to a method and apparatus for using sender identity to control unsolicited messaging in real time messaging networks.

BACKGROUND

There are two quite different types of electronic networks that are evolving: a standard telephone network and a data network (e.g., the Internet). The standard telephone network, such as a wireless telephony network and the POTS network, is designed to carry real-time messaging content. Capacity is allocated in real-time bandwidth and once you have a connection of adequate bandwidth established between two points, data that is delayed is viewed as a network fault. Examples of communications that may be carried via a standard telephone network(s) include voice communications, multi-party conference calls, video conference calls, or the like.

Another characteristic of standard telephone networks is that each network is typically owned and controlled by a small number (typically a single company in the case of wireless networks) of large companies that historically have provided service directly to end users of the network and therefore have a billing type relationship with them. Where a connection is made through the facilities of another provider, there is typically a commercial contract in place between the two companies. These standard telephone networks, in part because of the relatively close relationship between the service vendors and network users, have the characteristic that the originator of a call can be readily identified, allowing "caller ID" service to be readily implemented and to be widely known and in fact expected.

In contrast, the second type of network (e.g., data networks such as the Internet, LANs, WANs, VPNs, and the like) were designed to move mostly one-way, non-real time data from point to point. In this type of network, the delay of data has typically not been regarded as a network fault. Additionally, some data networks, particularly the Internet, are far more disjoint than a standard telephone network. There are many more companies involved, and there is much less control of individual point-to-point end-user connections. It is typical that a company that provides transmission of data on the Internet has a tenuous commercial relationship with the originators of most of the data packets that it is carrying. In fact, many Internet service providers (ISPs) protect the privacy and anonymity of their subscribers.

This tenuous commercial relationship with end users coupled with the relative ease with which the end-user computers that originate much of the traffic on the Internet can be anonymously enlisted in the service of third parties, leads to the fact that a "caller ID" type service is nearly impossible to implement on the Internet.

In recent years, these data networks have begun to evolve to provide real-time, two-way communications between parties. The communications may include, for example, voice-over-IP (VoIP), instant messaging, interactive video conferencing (e.g., web meetings), or the like.

Using the electronic data networks for real-time, two-way communications provides several advantages. In particular, using these electronic networks for real-time, two-way communications is relatively low cost and easily accessible. The proliferation of networks throughout today's society, particularly the Internet, has ensured ready access to a communications device capable of communicating with any other individual communicatively coupled to the same network. Essentially anyone with a computer, a personal data assistant, a wireless telephone, or the like can connect to the Internet and communicate with someone at a remote location within seconds. Likewise, companies can use internal networks (e.g., WANs, VPNs, or the like) to allow geographically dispersed employees to communicate in real-time using many of the same technologies. Notably, the communications can frequently occur with equipment already purchased as networks and access devices are generally already in place to handle data needs.

As this type of communication becomes more widespread, it will inevitably become a target for advertisers and telemarketers as a method to distribute advertising messages in vast quantities. Because of the low cost of distributing massive amounts of advertising, advertisers can economically transmit advertising communications with response rates that are orders of magnitude less than would be necessary to support more traditional means of advertising. Additionally, as discussed above, anonymity given to the sender prevents "do not call" lists and caller-ID type mechanisms from providing an adequate solution.

Electronic mail (e-mail) has already seen this problem. E-mail is a store-and-forward communications method in which one-way communications (as opposed to a two-way communications) are sent from one network node to another network node until the final destination is reached, where a recipient may or may not retrieve a message or respond. Because e-mail is inexpensive and advertisers can transmit massive amounts of e-mail quickly (and often automatically), e-mail advertisements (e.g., junk e-mail) are becoming a burden to networks and users alike. This use of e-mail to send massive amounts of advertisements is known as the e-mail "spam" problem.

In order to enable real-time messaging (RTM) over the previously data oriented structure of the Internet, an infrastructure of real time messaging protocols has been developed and deployed. The protocols include H.323; "Packet-based Multimedia Communications Systems", International Telecommunications Union, February 1998, RFC 3261, "SIP: Session Initiation Protocol", Internet Engineering Task Force, March 1999, (SIP) for establishing real time communication sessions and RFC 1889; "RTP: A Transport Protocol for Real Time Applications" (RTP), Internet Engineering Task Force, March 1999, for transmission of real time data streams.

These RTM protocols, however, have the same characteristic as the Internet's email protocol (e.g., SMTP) in that they do not provide a reliable way of identifying the sender of a message or the initiator of a telephony connection, and of course they share the same transmission media and therefore the same cost structure as email.

It is important to note that unsolicited RTM messages differ from email spam in a number of important ways and therefore optimal solutions for identifying and suppressing unsolicited RTM messages are likely to differ from strategies that would be most effective on email spam. For example, RTM, is primarily interactive and involves the receiving person being interrupted. This is true whether the receiving individual chooses to accept the incoming RTM messaging session or not. A ringing phone or an incoming RTM message demands an immediate response, if only to choose not to accept the call. With unsolicited RTM messages, therefore, damage and expense has occurred before any message content has been transmitted and suppression techniques during the session initiation phase are more important for RTM messages.

A system that is currently used to identify callers in the public switched telephone network (PSTN) is that network's 'Caller ID' system. In this case an identification string associated with the source of an incoming telephone call is transferred to a display device at the receiving end of a telephone call between the first and second ring. The contents of the identification string is information that is entered into a database by the phone company that the originating caller has contracted with for telephone service. Because the phone companies typically sell suppression of this string as an 'unlisted number' service, it is of limited use in the suppression of unsolicited/unwanted RTM messages.

In addition, when messages originate from devices connected to the Internet, as opposed to the PSTN itself, there is no guarantee that reliable caller ID data will be available.

Therefore, there is a need for a method and system to provide RTM end users with the ability to identify unsolicited and/or unwanted RTM connections or messages and, preferably, to control those messages, such as by filtering them into those that are to be received immediately and those that are to be suppressed, diverted or acted on automatically in some other way.

SUMMARY OF THE INVENTION

These and other problems are generally solved or circumvented, and technical advantages are generally achieved, by preferred embodiments of the present invention which relates to a method and apparatus for using sender identity to control unsolicited messaging in real-time messaging networks.

In accordance with an embodiment of the invention, there is provided a system for controlling unsolicited messaging in a real-time messaging (RTM) network. The RTM network may include a message originator and a message recipient wherein the message originator initiates communications with the message recipient in accordance with call initiation requests transmitted in the RTM network. In an embodiment, the system may include:

a signing gateway communicatively coupled to the RTM network signing and relaying call initiation requests on behalf of at least one message originator to provide an origination characteristic to the call initiation requests; and a verifying gateway communicatively coupled to the RTM network verifying call initiation requests on behalf of at least one message recipient to determine origination characteristics and determining a delivery action to selectively deliver the call initiation requests in response to the origination characteristics.

Preferably, the signing gateway marks the call initiation requests with at least one of a digital signature, an originating internet protocol (IP) address, or by encrypting the call initiation request.

The system may also include a public key store coupled to the signing gateway and verifying gateway for providing a public key of a private/public key pair (or other marking information, such as IP addresses) to the verifying gateway, and/or the signing gateway.

The system may also include one or more reputation information stores coupled to the verifying gateway, and/or the signing gateway wherein the reputation information store includes reputation information for the message originators in association with respective origination characteristics.

The delivery action may comprise, for example, one or more of completing the delivery of the call initiation request, rejecting the delivery of the call initiation request, and filtering the call initiation request.

Moreover, the RTM network may be configured to provide at least one of voice over internet protocol (VoIP) services, instant messaging (IM) services, and video conferencing services.

These and other aspects including one or more method aspects and computer program product aspects will be apparent to those of ordinary skill in the art.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
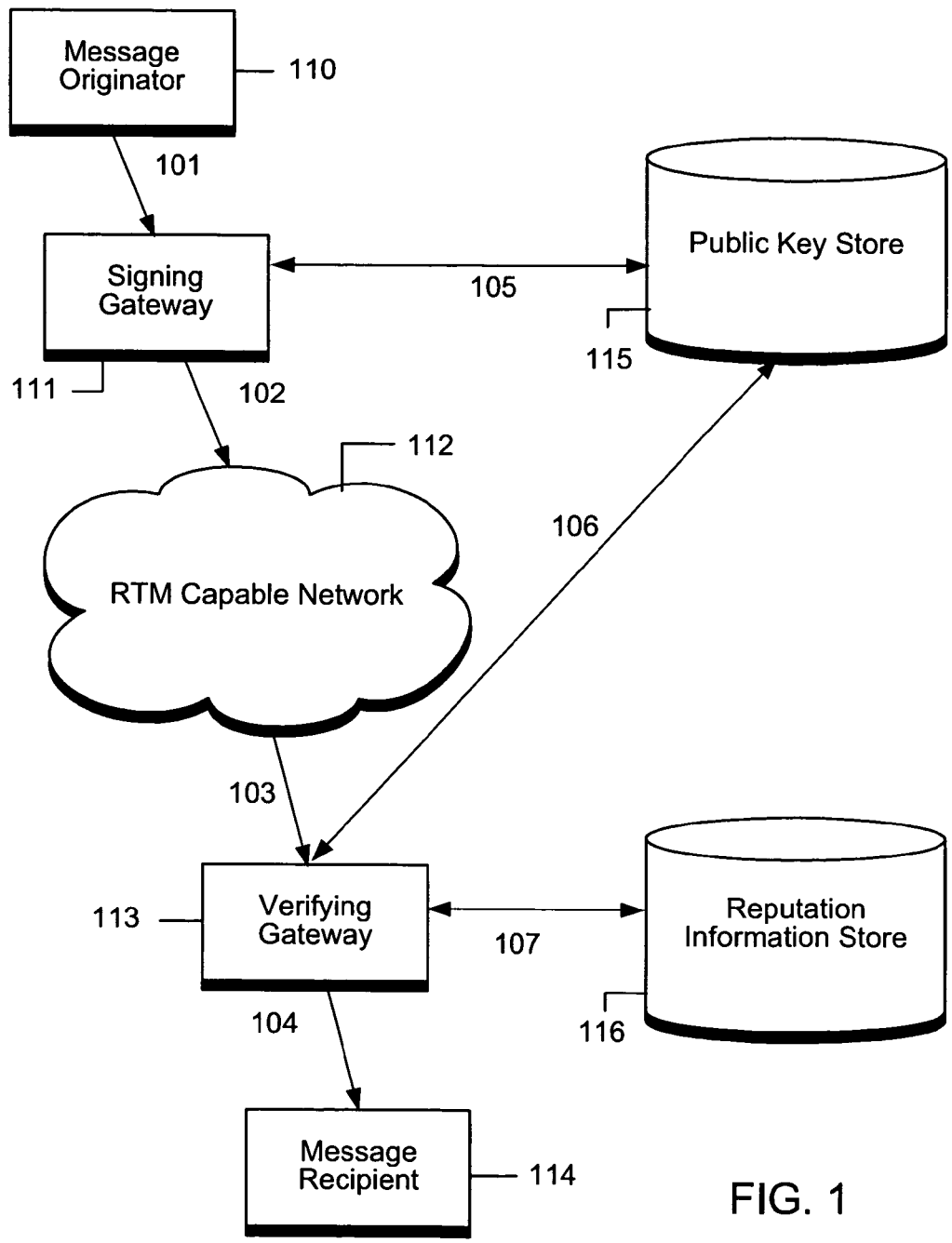
FIG. 1 is a block diagram of the architecture for controlling the delivery of unsolicited RTM communications according to an embodiment of the present invention.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

FIG. 1 illustrates the overall architecture and the communications context of an RTM network in accordance with an embodiment of the present invention.

The RTM network may be any type of network that supports a messaging modality that may be used in an interactive two-way conversational mode between a plurality of communicating terminal devices over a communications network. RTM may also be used to send messages to a message store (i.e. a voice mailbox or integrated messaging mailbox), but RTM is distinguished from electronic mail in that it is designed to support two-way conversation. RTM includes protocols where the communication session is established using SIP or H.323 and messaging is done via one or more of voice, video, text, whiteboard or multimedia data streams. Examples of real time messaging communications include VoIP (Voice over Internet Protocol), video conferencing, and IM (Instant Messaging).

In normal operation of the real time messaging network, a message originator 110 and a message recipient 114 participate in RTM communications via a RTM capable network 112 such as the Internet or a WAN (wide-area network). The message originator 110 may be, for example any terminal device that is capable of communicatively coupling to the network 112 and that initiates an RTM call or invites a message recipient 114 to join an existing RTM call. Similarly, the message recipient 114 may be, for example, any terminal device that receives an RTM call or invitation to join an existing call. Typically, it is expected that the message originator 110 and the message recipient 114 connect to the network 112 via a service provider. Examples of terminal devices include personal computers, laptop computers, mobile phones, personal data assistants (PDAs), pocket-PCs, functions/programs running thereon, and the like.

Similar to a telephone number, an RTM message is communicated using a destination RTM address associated with a user who is intended to receive the message. In FIG. 1 the message recipient 114 terminal device is configured to receive incoming RTM messages for the destination RTM address. A user may have one or more terminal devices that can receive RTM messages destined for a given RTM address and may, like a home and office telephone number, have one or more RTM addresses associated with himself.

In order for an RTM message to be delivered, however, the originating RTM address is typically not required. It is sufficient to establish a communications pathway of arbitrary complexity between the message originator 110 and the message recipient 114 terminal devices. Often the originating RTM address is provided in the call initiation packets, but in the same way that an unlisted telephone number shows up as 'private number' on a call display device, this is not required.

In accordance with an embodiment of the present invention, FIG. 1 shows one or more message originators 110 and message recipients 114 connected via an RTM capable network. Signing and verifying gateways 111, 113 are illustrated as separate network nodes through which all RTM network traffic for the message originator 110 and the message recipient 114 must pass, respectively. However, persons of ordinary skill in the art will appreciate that signing and verifying gateways 111, 113 may reside elsewhere, such as within originating and recipient terminal devices 110, 114 themselves or within network infrastructure nodes.

It should be noted that the message traffic illustrated as 101-104 refers, in this embodiment, to the messaging involved in establishing a RTM communications session rather than the content (i.e. video or audio data) of the session. Cryptographic signing or encryption, or marking via source IP address of the content of the RTM message may be used as an alternative to using the call set up information as described here.

Though signing gateway 111 and verifying gateway 113 are illustrated as communicating with the public key store 115 and reputation information store 116 outside RTM capable network 112, some or all of such communications may be within such network 112. The signing gateway 111 may be any device that relays call initiation requests from a terminal device, e.g., the message originator 110, and signs the relayed call initiation message with the private key of the signing entity, or any function that signs or otherwise marks, such as with a source IP address, the initiation requests. Similarly, the verifying gateway 113 may be any device that relays incoming call initiation requests to a terminal device, e.g., the message recipient 114, and verifies the cryptographic signature on the initiation message with the public key of the signing entity, or any function that verifies the signature, mark or origin of the initiation requests.

In the flow of events diagrammed in FIG. 1, the message originator 110 wishes to engage the message recipient 114 in RTM communications either by establishing a new RTM call or by adding the recipient to an existing RTM call.

The message recipient 114 wishes to be solicited to engage in an RTM call only if the message originator 110 wishes to exchange information that is of interest to the message recipient 114. As a surrogate for knowing if an incoming call is of interest to the message recipient, the reputation of the message originator is used to decide whether an incoming call should be signaled to the message recipient 114 or whether it should be filtered in some way.

The steps involved in this system begin with the message originator 110 sending a RTM call set up request to a related signing gateway 111.

The signing gateway 111 is associated with the message originator 110 through some relationship in the real world. The preferred relationship is that the signing gateway 111 represents a company and that the message originator 110 works for that company. Other reasonable relationships would be that the signing gateway represents a single individual, or that the signing gateway 111 represents a service provider and that the message originator has a contract with the service provider to provide RTM service.

Typically there would be an authentication mechanism (not shown), such as an access control list or a shared encryption key that would limit the set of message originators 110 that would be able to have any given signing gateway 111 sign call set up messages.

In this embodiment, the signing gateway 111 has at least one public/private key pair available to it for signing messages. The key pair may have been generated by the signing gateway 111 or given to it via a configuration mechanism. The public key is made available to the verifying gateway 113 when it is required to verify the digital signature on the received call set up request.

The public key may be made available to the verifying gateway 113 by storing it in a public key store 115, or by passing it with the message to be verified or as part of the communication session that transfers the message to be verified to the verifying gateway. The public key store 115 may be, for example, a storage device that is communicatively accessible to the message originator 110 and the message recipient 114. In an embodiment, the public key store 115 is communicatively coupled to the RTM network. In another embodiment, the message originator 110 and/or the message recipient 114 accesses the public key store 115 via out-of-band mechanisms such as the Internet DNS mechanism, Internet HTTP access, or the like. The public key store 115 may also comprise bulk storage of public keys on a CD-ROM distributed by conventional mail.

It should be noted that the use of public key technology is provided for illustrative purposes only and that other technologies may be used. For example, the signing gateway, rather than signing message components, may arrange for the message components to originate from one of a specific set of IP addresses and that the set of IP addresses from which a legitimate RTM message from the sender would originate could be made available in an IP Address Store that would always behave as the Public Key Store 115 described for this embodiment, except that it would store IP address information rather than public keys.

In the case of a network addressable public key store 115 as illustrated in FIG. 1, the signing gateway may communicate the public key to the public key store 105. Alternatively, the public key store may be populated by an outside agency, such as a user, to load both the public key in the public key store 115 and the private key in the signing gateway 111.

If a separate public key store 115 is used to pass the public key to the verifying gateway 113, the public key store 115 could be accessed by the verifying gateway 113 via a standard Internet protocol. The preferred protocol would be DNS, which is tuned to respond quickly to small queries. Alternatively, remote procedure calls of one form or another (e.g., HTTP) could be used. As a further example, public keys could be distributed by some non-network related mechanism and loaded into a local key store residing in the same device that contains the verifying gateway 113.

The public key is preferably associated in some verifiable way with the signing gateway 111, or more specifically the real world entity (such as a corporation or service provider) that the signing gateway is acting on behalf of.

In this embodiment of the invention, the signing gateway 111 is described as acting on the behalf of a single entity. In other embodiments it could reasonably be acting on behalf of several organizational entities simultaneously, or in fact it could simultaneously act on behalf of each individual sender within a number of organizations.

If the public key is passed as part of the message, an association may be made via an X.509 digital certificate chain where an identifier (typically an URL) is bound to a public key via a digital signature involving public keys that are chained together via digital signatures up to a public key associated with a root certificate that is typically loaded via a configuration interface into the verifying gateway 113. In this case the corporation that owns the root certificate in the chain is guaranteeing that the name and the public key are legitimately bound together. This type of name/public key association is described in detail in Digital Certificates: Applied Internet Security, Jalal Feghhi, Jalil Feghhi, Peter Williams, Addison Wesley Longman, Inc, 1998, which is incorporated herein by reference.

If the public key is passed via a network accessible out of band public key store 115 the association can be made by one of the standard Internet mechanisms such as an SSL with X.509 certificates for an HTTP access or by fetching the public key from a DNS server that is authoritative for the DNS domain owned by the real world entity. In the latter case the association may not be as cryptographically secure, but the DNS infrastructure has proved relatively immune to spoofing and therefore could be adequate in this case.

The signing gateway 111 digitally signs the call set up request (or parts therof) using a message digest function and encrypts the message digest with the private key of the public/private key pair as is well known standard practice. The digital signature is typically included as part of the message, but it may be passed separately as part of the same communications session. Alternatively or additionally, the signing gateway may encrypt the call initiation request using the public key, or send it from a specific IP address to mark it for the verifying gateway.

Similarly, an identifier associated with the real world entity for which the signing gateway 111 is acting and to be used as a look up key with an out of band public key store 115 is typically included with the signed message, but may be passed separately as part of the same communications session. Typically this identifier would be a standard Internet universal resource locator (URL).

The signing gateway 111 then passes the call set up request to the verifying gateway 113 via an RTM capable network 112 such as the Internet. This transmission is labeled 102 and 103 in FIG. 1.

The verifying gateway 113 first obtains the public key of the public/private key pair used by the signing gateway to sign the call set up requests using one of the mechanisms described above. It then verifies that the set up request has been signed with the private key associated with this public key.

If the call set up request is correctly signed, the verifying gateway 113 retrieves information regarding the real world entity for which the signing gateway digitally signed the call set up message from a reputation information store 116. The reputation information store 116 is preferably an information store that is updated with information regarding the behavior of one or more message originators, signing gateways or relaying component that could be part of the transmission path for an RTM message that arrives at the verifying gateway 113. The reputation information store 116 may, for example, be connected to the RTM network, available via an alternate network, local to the verifying gateway 113, or the like. The information in the reputation information store 116 may describe the behavior observed over one or more transmitted messages or over as few as a single message. The reputation information store 116 may, for example, include information about sender behavior that is directly observed in some way, such as observations that a particular sender sent unsolicited RTM messages to a honeypot or sensor address. A honeypot or sensor address, for example, may be an address that does not correspond to an actual person, but rather is created for the purpose of receiving unsolicited RTM messages. The use of sensor addresses to collect information regarding sender behavior is discussed in U.S. patent application Ser. No. 11/019,092, filed on Dec. 21, 2004, entitled Method and Apparatus for Controlling Unsolicited Messaging, which is incorporated herein by reference. The reputation information store 116 may also include indirect measures of reputation, such as the fact that a given sender has registered with a 'bonding authority' and has put money in trust to be distributed by the bonding authority to recipients of its RTM messages that the recipient interprets as unsolicitied and undesireable RTM messages.

The verifying gateway 113 may retrieve information from the reputation information store 116 using, for example, the same identifier (e.g., URL) that was used to locate the public key in the public key store 115, an identifier accompanying the message (e.g., included in an X.509 certificate), the public key itself, some other cryptographic signature related measure that may be attached by the sender to aid in sender identification, or the like. The information may also be indexed by an originating IP address or other call set up or message related characteristics. It should be noted that the reputation information store 116 may be indexed by message related characteristics that are not necessarily related to true sender identification, but rather to message characteristics, which may, in fact, have been added by the sender to deliberately obscure the identification of the true sender. Examples of the latter would be patterns in specific lines of the request, the originating IP address and checksums of call set up or message packets or of components (e.g., individual lines or preprocessed lines) of such packets.

In an embodiment, the reputation information store 116 is provided by a third party to store information regarding RTM message senders. In another embodiment, the reputation information store 116 is provided by a sending entity, such as a corporation, a university, or the like, to provide public visibility for message characteristics, such as a list of valid originating IP addresses, that the sending entity warrants that a legitimate message from it will have. In this embodiment, the validity of the reputation information store 116 itself may be determined via a mechanism such as the X.509 certificate chains used to secure Internet shopping sites or the DNS mechanism used to associate Internet site names (URLs) with IP addresses.

Thus the marking of a call initiation request by digital signature, modification or addition of an originating IP address as described above, or public key encryption used in place of just using digital signatures as described in this embodiment, provides a mechanism for verifying an origination characteristic relates to the real world source of the request and may directly or indirectly identify at least one of: an entity associated with the marking the call initiation requests; a message originator originating the call initiation requests; and an affiliation of the message originator. Such may be indicated by URL, IP address, domain name and other network information. Persons of ordinary skill in the art will appreciate that other information may indicate origination.

Within the reputation store there may be information grouped by real world entity, by identifier and by public key, or by message characteristics such as patterns in specific lines. A real world entity may have several identifiers associated with it and an identifier may well be associated with several public/private key pairs.

The reputation information store 116 returns information (for example previously observed behavior) about signing gateways that are associated with the identifier (and by implication with a specific real world entity) or that used the private key associated with the public key used in the reputation lookup to sign RTM call set up requests.

Note that this embodiment describes a single reputation store. Other embodiments may use several reputation stores, such as the 'bonding authority' scenario described above, or even a reputation store per sender, such as where the sender has assertions he wishes to make about his own behavior and there is a way, such as third party measurements, of determining some measure of how valid his assertions are.

One example of information that may be collected and stored in the reputation information store would be connection requests that have been made on a set of sensor RTM URLs that have been made available on web sites for spammers to collect, but do not represent real people. If any of these connection requests use a public key found in the reputation information store 116, the conclusion can be drawn that public/private key pair is being used by a spammer.

Another example of information that may be collected and stored in the reputation information store 116 is a count of the number of requests made by verifying gateways for that particular real world entity, identifier or public key. If a plurality of reputation stores work together to propagate these counts to each other, a measure of the amount of traffic being generated by that real world entity, identifier or public key could be obtained and used to make judgments about the sender.

A third example of information that may be collected and stored in the reputation information store 116 would be that if the identifier was in the form of an URL, to try to connect to that URL via TLS and see if the URL provides a valid X.509 certificate.

The information returned by the reputation information store 116 is then used by the verifying gateway 113 to choose a policy action which would typically be to accept, not accept, pass on to a RTM message store or to otherwise filter or act on the call set up request.

If the call set up request is not signed, or if the signature cannot be successfully validated, that fact also provides (a more limited amount of) information on which a policy decision can be based.

By way of example a policy might be that if a connection request is made from a commercial entity to an URL that is associated with receiving business communications and the time is outside of normal work hours, the call set up request might be forwarded to a business related RTM message store.

A second example of a policy would be that if an unsigned call set up request was received, a challenge-response interaction might be enacted with the message originator. To provide more detail, with respect to the concept of a challenge-response interaction, if the incoming call request involved a voice channel, the voice message 'please enter '0' to complete your call' could be played and if the DTMF (Dual Tone Multi-Frequency) tone pair for the keypad "0" is detected the call is put through. Otherwise a message could be played saying that the call could not be connected and the call dropped. This could happen automatically without the message recipient being notified of the call set up request (i.e. without a VoIP phone ringing).

A third example of a policy involves reputation information being derived directly from the behavior of the message originator. If a message originator sends several call set up requests for several nonexistent message recipient URL's within a short time span, and then sends a call set up request for an existing message recipient URL, the response 'no such user' could be returned on the assumption that the message originator was executing a dictionary attack using constructed URL's. Further the detection of a dictionary attack could be forwarded to a reputation store so that other connections from that source could be recognized as probable attacks on the first connection attempt.

The final step in the process is for the verifying gateway to enforce the selected policy action and to complete, reject or to filter the incoming call set up request.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for controlling unsolicited messaging in a real time messaging (RTM) network, the method comprising:
   receiving a call initiation request from a first terminal device coupled to the RTM network;

marking the call initiation request on behalf of the first terminal device to identify an origination characteristic of the initiation request, generating a marked call initiation request;

transmitting the marked call initiation request on the RTM network for delivery to one or more second terminal devices coupled to the RTM network;

verifying the marked call initiation request on behalf of at least one of the second terminal devices to determine the origination characteristics of the marked call initiation request;

determining a delivery action in response to the verifying;

delivering the marked call initiation request in accordance with the delivery action; and determining a reputation associated with the call initiation request in response to the origination characteristic and wherein the determining a delivery action is responsive to the reputation.

2. The method of claim 1, wherein the marking comprises applying a digital signature to the call initiation request.

3. The method of claim 2, wherein the applying a digital signature to the call initiation request comprises:

creating a message digest of the call initiation request;

applying a private key of a public/private key pair to the message digest to generate the digital signature; and providing a public key of the public/private key pair for verifying the digital signature.

4. The method of claim 1, wherein the marking comprises applying an originating internet protocol (IP) address to the call initiation request or portions of the call initiation request.

5. The method of claim 4, where a set of legitimate originating IP addresses are provided via a publicly available IP address store.

6. The method of claim 1, wherein the marking comprises encrypting the call initiation request.

7. The method of claim 6, wherein the encrypting the call initiation request comprises:

applying a private key of a public/private key pair to the call initiation request to encrypt the call initiation request for transmitting; and providing a public key of the public/private key pair for decrypting and verifying the call initiation request.

8. The method of claim 7, wherein the providing a public key comprises providing the public key to a public key store for electronic retrieval.

9. The method of claim 1, wherein the origination characteristic identifies at least one of an entity associated with the call initiation requests, a message originator originating the call initiation requests, and an affiliation of the message originator.

10. The method of claim 1, wherein the RTM network is configured to provide at least one of voice over internet protocol (VOIP) services, instant messaging (IM) services, and video conferencing services.

11. The method of claim 1, wherein the determining a respective reputation comprises retrieving the reputation from one or more stores of reputation information in response to the origination characteristic.

12. The method of claim 1, wherein the determining a delivery action comprises applying a policy in response to the reputation, the policy defining rules for directing a delivery of the call initiation request.

13. The method of claim 1, wherein the delivery action comprises at least one of completing the delivery of the call initiation request, rejecting the delivery of the call initiation request, and filtering the call initiation request.

14. The method of claim 13, wherein the filtering the call initiation request comprises at least one of interacting with the first terminal device of the call initiation request and taking a message from the first terminal device.

15. A method for controlling unsolicited messaging in a real time messaging (RTM) network, the method comprising:

verifying an origination of a call initiation request on behalf of a first terminal device, the verifying being performed at least in part using marks included in the call initiation request that identifies an origination characteristic of the call initiation request;

determining a delivery action in response to the verifying, wherein the determining includes determining a reputation associated with the origination and wherein the determining a delivery action is responsive to the reputation; and delivering the call initiation requests in accordance with the delivery action.

16. The method of claim 15, wherein the verifying is performed at least in part by verifying a digital signature associated with at least a portion of the call initiation request.

17. The method of claim 15, wherein the verifying is performed at least in part by verifying an originating internet protocol (IP) address.

18. The method of claim 15, wherein the verifying is performed at least in part by verifying an encrypted call initiation request or encrypted portion thereof.

19. The method of claim 15, wherein the origination identifies at least one of an entity associated with the marking of the call initiation requests, a message originator originating the call initiation requests, and an affiliation of the message originator.

20. The method of claim 15, wherein the verifying comprises using a public key to validate a digital signature.

21. The method of claim 15, wherein the determining a reputation comprises retrieving the reputation from one or more stores of reputation information associated with the origination or marking of the call initiation.

22. The method of claim 15, wherein the determining a reputation comprises retrieving the reputation from one or more stores of reputation information associated with the call initiation request.

23. The method of claim 15, wherein the determining a delivery action comprises applying a policy in response to the reputation, the policy defining rules for directing a delivery of the call initiation request.

24. The method of claim 15, wherein the delivery action comprises at least one of completing the delivery of the call initiation request, rejecting the delivery of the call initiation request, and filtering the call initiation request.

25. The method of claim 24, wherein the filtering the call initiation request comprises at least one of interacting with a second terminal device associated with the call initiation request; and taking a message from the second terminal device, wherein the second terminal device is associated with the origination of the call initiation request.

26. The method of claim 15, wherein the RTM network is configured to provide at least one of voice over internet protocol (VOIP) services, instant messaging (IM) services, and video conferencing services.

27. A system for controlling unsolicited messaging in a real time messaging (RTM) network, the system comprising:

a signing gateway communicatively coupled to one or more message originators and to the RTM network, the signing gateway being configured to receive a call initiation request from a first message originator, mark the call initiation request to generate a signed call initiation request, and relay the signed call initiation request to the RTM network on behalf the first message originator, the signed call initiation request identifying an origination characteristic of the call initiation request;

a verifying gateway communicatively coupled to the RTM network and one or more message recipients, the verifying gateway being configured to receive the signed call initiation request, verify the signed call initiation request on behalf of at least one message recipient to determine the origination characteristic, and determine a delivery action to selectively deliver the signed call initiation request in response to the origination characteristic; and one or more reputation information stores communicatively coupled to the verifying gateway, the reputation information stores comprising reputation information for at least some of the message originators, wherein the verifying gateway is configured to determine a reputation for the message originator associated with the signed call initiation request and to selectively deliver the signed call initiation request in response to the reputation.

28. The system of claim 27, wherein the signing gateway marks the call initiation requests with at least one of a digital signature, an originating internet protocol (IP) address, or by encrypting a call initiation request.

29. The system of claim 27, further comprising a public key store communicatively coupled to the signing gateway and verifying gateway, the public key store providing a public key of a private/public key pair to the verifying gateway, and wherein the signing gateway is configured to mark the call initiation request by applying a private key of the private/public key pair and the verifying gateway is configured to verify the signed call initiation request by applying the public key.

30. The system of claim 27, wherein the delivery action comprises at least one of completing the delivery of the call initiation request, rejecting the delivery of the call initiation request, and filtering the call initiation request.

31. The system of claim 27, wherein the RTM network is configured to provide at least one of voice over internet protocol (VOIP) services, instant messaging (IM) services, and video conferencing services.

* * * * *

UNITED STATES PATENT AND TRADEMARK OFFICE
CERTIFICATE OF CORRECTION

| | |
|---|---|
| PATENT NO. | : 7,613,923 B2 |
| APPLICATION NO. | : 11/066660 |
| DATED | : November 3, 2009 |
| INVENTOR(S) | : Gilchrist et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1110 days.

Signed and Sealed this

Nineteenth Day of October, 2010

David J. Kappos
*Director of the United States Patent and Trademark Office*